US011881902B2

(12) United States Patent
Redmond et al.

(10) Patent No.: US 11,881,902 B2
(45) Date of Patent: Jan. 23, 2024

(54) ACOUSTIC NODE FOR CONFIGURING REMOTE DEVICE

(71) Applicant: Schneider Electric Systems USA, Inc., Foxboro, MA (US)

(72) Inventors: James Redmond, Richmond (CA); Stephen Neave, Kanata (CA); Scott Guimond, Gatineau (CA); Zackery Sobin, Raleigh, NC (US)

(73) Assignee: SCHNEIDER ELECTRIC SYSTEMS USA, INC., Foxboro, MA (US)

( * ) Notice: Subject to any disclaimer, the term of this patent is extended or adjusted under 35 U.S.C. 154(b) by 329 days.

(21) Appl. No.: 17/318,318

(22) Filed: May 12, 2021

(65) Prior Publication Data

US 2022/0224422 A1    Jul. 14, 2022

Related U.S. Application Data

(60) Provisional application No. 63/135,323, filed on Jan. 8, 2021.

(51) Int. Cl.
| | |
|---|---|
| *H04B 11/00* | (2006.01) |
| *G10L 25/51* | (2013.01) |
| *H04R 1/08* | (2006.01) |
| *G05B 19/042* | (2006.01) |

(Continued)

(52) U.S. Cl.
CPC ......... *H04B 11/00* (2013.01); *G05B 19/0426* (2013.01); *G10L 25/51* (2013.01); *H04R 1/025* (2013.01); *H04R 1/08* (2013.01); *H04R 3/08* (2013.01); *G05B 2219/23038* (2013.01)

(58) Field of Classification Search
CPC ............... H04B 11/00; G05B 19/0426; G05B 2219/23039; G10L 25/51; H04R 1/025; H04R 1/08; H04R 3/00
See application file for complete search history.

(56) References Cited

U.S. PATENT DOCUMENTS

| | | | | |
|---|---|---|---|---|
| 3,513,399 A | * | 5/1970 | Wycoff ............... | H04W 88/027 340/7.49 |
| 6,760,276 B1 | * | 7/2004 | Karr ...................... | G10K 15/02 340/7.49 |

(Continued)

OTHER PUBLICATIONS

Extended European Search Report from EP Application No. 21213995.0, dated Jun. 14, 2022, 9 pages.

*Primary Examiner* — Steven Lim
*Assistant Examiner* — Son M Tang
(74) *Attorney, Agent, or Firm* — Stinson LLP

(57) ABSTRACT

Remote configuration of an industrial or remote telemetry device using sound. Acoustic energy directed from a remote programming device to a remote industrial or telemetry device has tones indicating a request to establish communication. By directing further acoustic energy from the remote programming device to the remote industrial or telemetry device, the remote programming device requests information relating to a current configuration of the remote industrial or telemetry device. The remote industrial or telemetry device processes the tones to identify the request and replies with acoustic energy that has associated tones indicating the information relating to the current configuration of the remote industrial or telemetry device.

20 Claims, 6 Drawing Sheets

(51) Int. Cl.
*H04R 1/02* (2006.01)
*H04R 3/08* (2006.01)

(56) References Cited

U.S. PATENT DOCUMENTS

| | | | | |
|---|---|---|---|---|
| 7,342,504 B2* | 3/2008 | Crane | ................... | G08B 29/14 |
| | | | | 702/50 |
| 7,512,593 B2* | 3/2009 | Karklins | ................ | G05B 19/05 |
| | | | | 711/111 |
| 7,860,874 B2* | 12/2010 | Karklins | ................ | G05B 19/05 |
| | | | | 700/83 |
| 8,031,069 B2* | 10/2011 | Cohn | ................... | G09F 3/0376 |
| | | | | 340/539.22 |
| 8,571,539 B1* | 10/2013 | Ranganathan | ........ | H04L 67/563 |
| | | | | 455/67.11 |
| 8,643,539 B2* | 2/2014 | Pauly | ................... | G01R 31/26 |
| | | | | 702/182 |
| 8,707,193 B2* | 4/2014 | Khazanov | ............ | H04L 67/125 |
| | | | | 715/764 |
| 8,794,353 B2* | 8/2014 | Benson | ................ | E21B 47/047 |
| | | | | 175/45 |
| 8,934,835 B2* | 1/2015 | Deluca | ............. | H04M 1/72445 |
| | | | | 705/16 |
| 9,258,710 B2* | 2/2016 | Kuroda | ................... | H04W 4/80 |
| 10,095,659 B2* | 10/2018 | Katz | ................... | G06F 17/00 |
| 10,434,988 B2* | 10/2019 | Gennermann | ........ | B60R 25/241 |
| 10,748,406 B2* | 8/2020 | Boerhout | ............ | G08B 21/18 |
| 10,887,550 B2* | 1/2021 | Coghlan | ................ | G06F 16/587 |
| 11,387,918 B2* | 7/2022 | Sun | ................... | H04L 27/2647 |
| 2004/0170381 A1* | 9/2004 | Srinivasan | ......... | G10L 19/0212 |
| | | | | 386/338 |
| 2005/0270151 A1* | 12/2005 | Winick | ................. | G08B 17/00 |
| | | | | 340/539.1 |
| 2006/0167638 A1* | 7/2006 | Murphy | ................ | G08C 17/00 |
| | | | | 702/56 |
| 2007/0254604 A1* | 11/2007 | Kim | ..................... | H04W 84/18 |
| | | | | 455/88 |
| 2008/0041930 A1* | 2/2008 | Smith | ................. | G06F 9/44505 |
| | | | | 340/572.1 |
| 2009/0328026 A1* | 12/2009 | Yamashita | ............... | G06F 8/65 |
| | | | | 717/170 |
| 2010/0110837 A1* | 5/2010 | Jung | ........................ | H04B 1/02 |
| | | | | 367/137 |
| 2010/0213924 A1* | 8/2010 | Osumi | ............... | G01R 31/2836 |
| | | | | 324/76.44 |
| 2012/0297036 A1* | 11/2012 | Frank | ..................... | H04L 12/12 |
| | | | | 709/221 |
| 2013/0241746 A1* | 9/2013 | McKinley | ............. | G01R 29/18 |
| | | | | 340/870.02 |
| 2014/0035607 A1* | 2/2014 | Heydron | .................. | H04Q 9/00 |
| | | | | 324/754.02 |
| 2014/0278255 A1* | 9/2014 | Anderson | ........... | G01R 15/125 |
| | | | | 702/189 |
| 2014/0279443 A1* | 9/2014 | Neeley | ..................... | G01D 1/00 |
| | | | | 702/188 |
| 2014/0348344 A1* | 11/2014 | Sun | ........................ | H04B 11/00 |
| | | | | 381/98 |
| 2015/0022181 A1* | 1/2015 | Anderson | ............. | G06F 9/5005 |
| | | | | 324/114 |
| 2015/0064021 A1* | 3/2015 | Laing | ..................... | F04C 14/00 |
| | | | | 417/18 |
| 2016/0088064 A1* | 3/2016 | Chen | ..................... | H04L 67/568 |
| | | | | 709/204 |
| 2017/0091251 A1* | 3/2017 | Wood | ..................... | G06F 16/182 |
| 2017/0288805 A1* | 10/2017 | Yim | ..................... | H04L 9/0625 |
| 2018/0075223 A1* | 3/2018 | Morcillo Montejo | . | G16H 50/20 |
| 2018/0364668 A1* | 12/2018 | Bostick | ................ | G06F 11/3466 |
| 2019/0103899 A1* | 4/2019 | Lee | ........................ | H04W 4/80 |
| 2020/0329031 A1* | 10/2020 | Hashimoto | ........... | H04W 12/30 |
| 2020/0359842 A1* | 11/2020 | Koh | ..................... | A47J 43/046 |

* cited by examiner

ACOUSTIC NODE FOR CONFIGURING REMOTE DEVICE

CROSS-REFERENCE TO RELATED APPLICATION

This application claims priority from U.S. Provisional Patent Application No. 63/135,323, filed Jan. 8, 2021, the entire disclosure of which is incorporated herein by reference.

BACKGROUND

Remote devices, such as Accutech or Instrument Area Network (IAN) remote telemetry devices, available from Schneider Electric, often operate outdoors in environments that can involve exposure to undesirable moisture, chemicals, and the like. These products use enclosures to protect against ingress of fluids, noxious gases, etc., such as those rated NEMA4 by the National Electrical Manufacturers Association (NEMA) and/or rated IP66 by the International Electrotechnical Commission (IEC). However, an operator using a device such as an Accutech or IAN remote telemetry device may still wish to communicate with the device to gather information from it while on site, to update its configuration, or to update its programming or firmware. Such communication requires either physical or wireless access. The device, ideally, will remain sealed and in place while the operator is communicating with it to prevent the risk of damage to the equipment and disruption of its associated processes.

Conventional solutions to this situation include physical approaches such as buttons on the outside of the enclosure or magnetic switches, or the use of wireless interfaces with a device such as a phone or tablet using wireless network protocols (e.g., WIFI) or short-range wireless technology (e.g., Bluetooth). For instance, production and maintenance of NEMA4 or IP66 compliant external buttons present cost and quality challenges. In addition, buttons are prone to failure over time as the sealing material around the buttons ages and is exposed to sunlight. Moreover, simple button approaches, which often rely on 2, 3, or 4 buttons to encompass a configuration, cannot efficiently transmit complex information such as strings, multiple parameters, etc.

Some industrial control panels include WIFI routers to enable a WIFI connection for providing wireless access to remote telemetry devices and the like. But WIFI connections greatly deprecate the battery life of the device.

SUMMARY

Briefly, aspects of the present disclosure provide an improved approach to exchanging status information, configurations, files, and programming between users and programmable logic controllers (PLC), sensors, remote terminal units (RTU), variable frequency drives (VFD), motor controllers, pump off controllers (POC), and other remote devices. An acoustic interface embodying aspects of the present disclosure addresses the cost and quality challenges with the production and maintenance of a NEMA4 or IP66 compliant external button. In addition, the acoustic interface provides the user a more efficient means of transmitting complex information such as strings, multiple parameters, etc. when compared to simple button approaches.

In an aspect, a method of configuring an industrial process device, including a a remote telemetry device, comprises directing first acoustic energy from a remote programming device to the industrial process device. The first acoustic energy has an associated tone or tones (sequential or non-sequential) indicating a request to establish communication between the remote programming device and the industrial process device. The method also includes processing the tone or tones associated with the first acoustic energy on the industrial process device to identify the request to establish communication and, in response to the industrial process device, accepting the request to establish communication and then directing second acoustic energy from the industrial process device to the remote programming device. The second acoustic energy has an associated tone or tones indicating acceptance of the request to establish communication. After processing the tone or tones associated with the second acoustic energy on the remote programming device to identify the acceptance of the request to establish communication, the method comprises directing third acoustic energy from the remote programming device to the industrial process device. The third acoustic energy has an associated tone or tones indicating a request for information relating to a current configuration of the industrial process device. The method further comprises processing the tone or tones associated with the third acoustic energy on the industrial process device to identify the request for information relating to the current configuration of the industrial or remote telemetry device and directing fourth acoustic energy from the industrial or remote telemetry device to the remote programming device. The fourth acoustic energy has an associated tone or tones indicating the information relating to the current configuration of the industrial process device.

In another aspect, an acoustic node coupled to an industrial process device comprises a microphone coupled to a receiver and configured to receive one or more incoming tones from a remote programming device. The acoustic node also comprises a speaker coupled to a transmitter and configured to transmit one or more outgoing tones to the remote programming device. A memory device stores processor-executable instructions that, when executed by an audio processor, configure the audio processor for converting the received one or more incoming tones to incoming digital data, authenticating the remote programming device based on the incoming digital data, and determining a command based on the incoming digital data. The audio processor instructs the remote industrial process device to execute the command and generates outgoing digital data responsive to the executed command. The audio processor is further configured for converting the outgoing digital data to the one or more outgoing tones, wherein the speaker transmits the one or more outgoing tones to the remote programming device.

In yet another aspect, a remotely configurable industrial system includes a remote programming device, an industrial process device, and the acoustic node coupled to the industrial process device.

Other features will be in part apparent and in part pointed out hereinafter.

DETAILED DESCRIPTION

Figure 1:
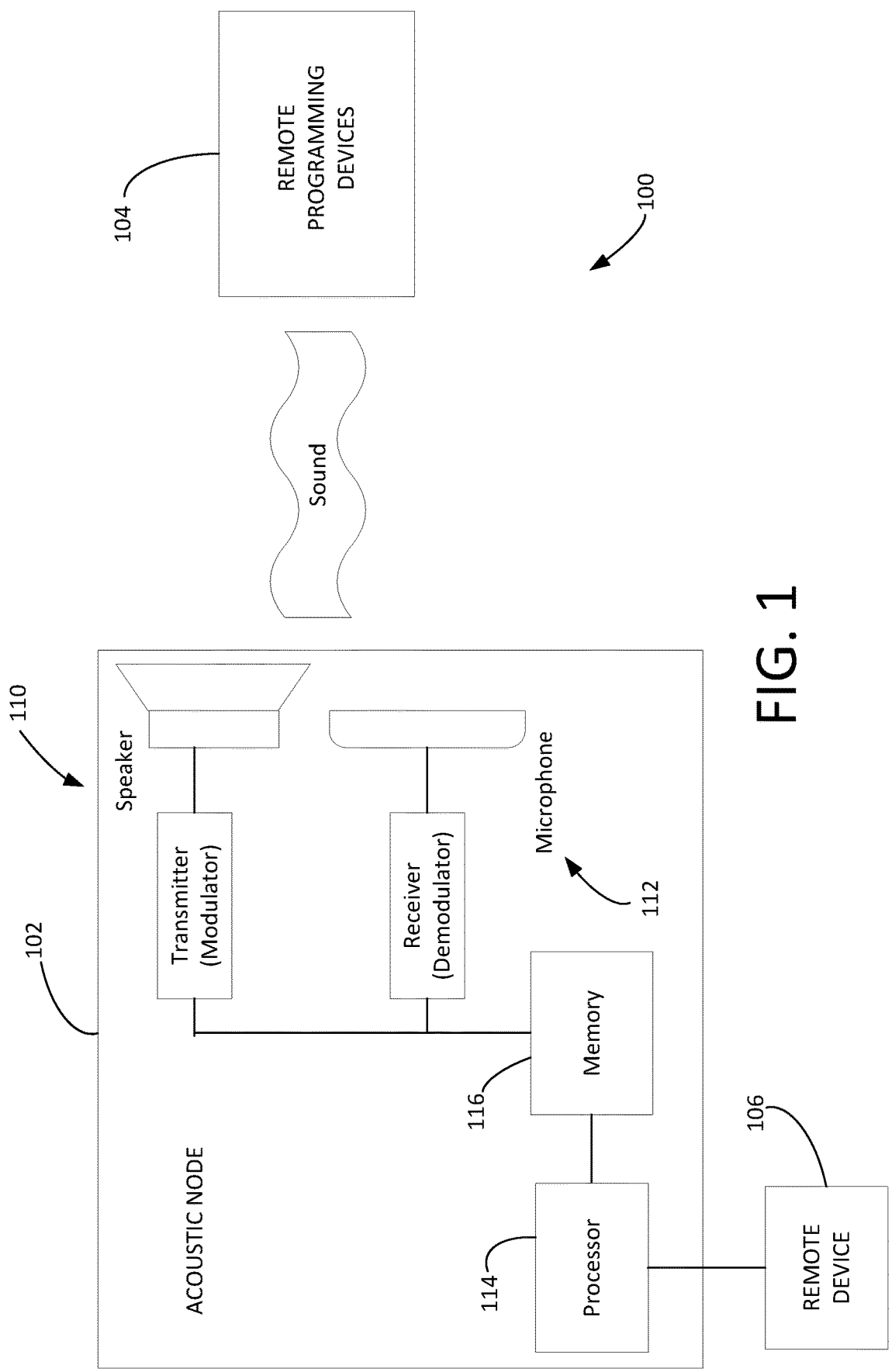
FIG. 1 is a block diagram of a system including an acoustic node interfacing with one or more remote programming devices according to an embodiment.

FIG. 1 illustrates a system 100 including an acoustic node 102 interfacing with one or more remote programming devices 104. Aspects of the present disclosure provide an improved approach to exchanging one or more of status information, configurations, files, and programming between users (via the remote programming device 104) and a remote industrial process device 106. The remote device 106 may be a remote telemetry device or industrial control device, including a programmable logic controller (PLC), sensor, remote terminal unit (RTU), variable frequency drive (VFD), motor controller, pump off controller (POC), or the like.

The acoustic node 102, which includes a speaker 110 and a microphone 112, is coupled to remote device 106. In an embodiment, the remote device 106 comprises a remote low power (e.g., battery or solar powered) sensor device such as an Accutech or IAN remote telemetry device. An audio processor 114 of acoustic node 102 is configured execute computer-executable code stored in a memory device 116 to interpret one or more tones, including a sequence of tones, received via the microphone 112 and derive digital information, such as data requests, instructions, configuration parameters, a logic application, and firmware, from the received tones. The tone or tones may be sequential or non-sequential. In addition, the communicated tones may be within or outside the audible range of human hearing and may or may not be encrypted.

In one embodiment, acoustic node 102 and remote device 106 are separate devices housed together within a sealed enclosure. In another embodiment, the speaker 110, microphone 112, and processor of acoustic node 102 are integrated with remote device 106 as a single device housed within a sealed enclosure.

In another embodiment, speaker 110 and microphone 112 are coupled to or integrated with remote device 106, namely, an industrial control device or remote telemetry device (e.g., VFD, PLC, or RTU) to form acoustic node 102. When integrated with the acoustic components, a computing device associated with remote device 106 is configured to interpret received tones and to derive digital information, such as data requests, instructions, configuration parameters, a logic application (including an IEC 61131-3 program), and/or firmware, from the received tones.

Figure 2:
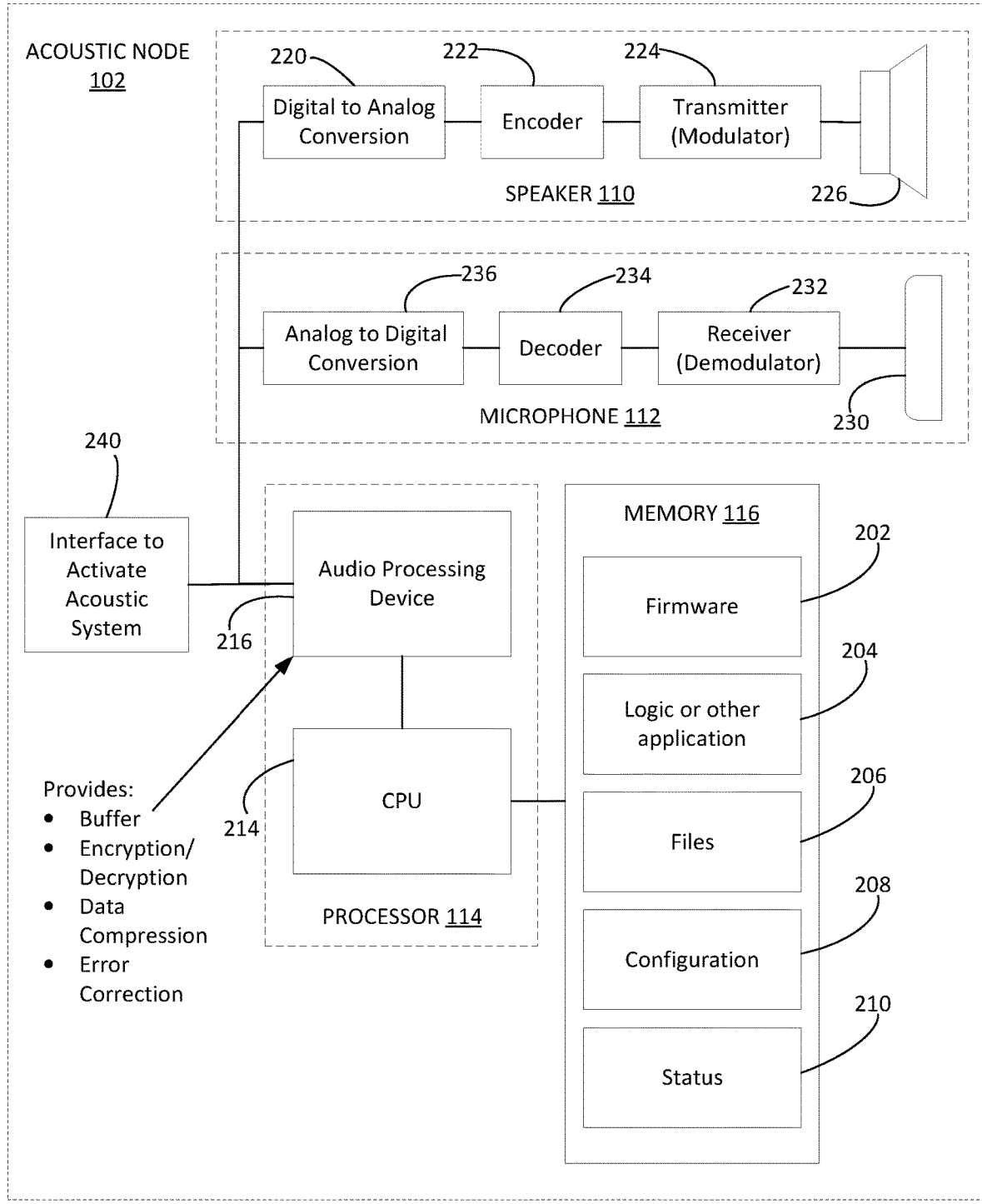
FIG. 2 is a block diagram of the acoustic node of FIG. 1.

FIG. 2 is a block diagram of the acoustic node 102 of FIG. 1 and illustrates additional components. In an embodiment, acoustic node 102 includes speaker 110, microphone 112, processor 114, and memory device 116.

In the embodiment of FIG. 2, memory device 106 stores one or more of firmware 202, logic or applications 204, files 206, configuration information 208, and status/historical information 210. The processor 114 of includes a central processing unit (CPU) 214 configured to execute processor-executable instructions (e.g., firmware 202 and/or logic or applications 204) stored in the memory device 116. The processor-executable instructions, when executed, configure the CPU 214 to receive digital signals from microphone 112 and process the signals to derive information, such as data requests, instructions, configuration parameters, logic applications (including an IEC 61131-3 program), and/or firmware. The processor-executable instructions, when executed, further configure the CPU 214 to generate digital signals for transmitting information via speaker 110. In addition, processor 114 includes an audio processing device 216 for performing various functions to prepare the digital signals to and from the acoustic components. These functions include one or more of buffering, encryption/decryption, data compression, and error correction.

The speaker 110 of FIG. 2 includes a digital to analog (D/A) converter 220, an encoder 222, and a transmitter 224. The D/A converter 220 receives the digital signal from CPU 214 via audio processing device 216 and converts it to a corresponding analog signal. The encoder 222 then encodes (e.g., converts or translates) the analog signal output from D/A converter 220 into a selected audio format for transmission. The transmitter 224 outputs a modulated signal to a speaker cone 226, which in turn outputs the corresponding acoustic signal to remote programming device 104. Conversely, microphone 112 includes a transducer 230 for receiving an acoustic signal from remote programming device 104. The microphone 112 in the illustrated embodiment also includes a receiver 232, a decoder 234, and an analog to digital (A/D) converter 236. The receiver 232 demodulates the acoustic signal captured by the transducer 230 and the decoder 234 then decodes the analog signal from the demodulated signal. In this instance, the A/D converter 236 receives the analog signal and outputs a corresponding digital signal to audio processing device 216.

While acoustic node 102 advantageously eliminates the need for a NEMA4 or IP66 compliant external button, it is to be understood that a physical interface 240 could be provided for manually activating or initiating the transmitting and/or receiving of acoustic signals.

According to a further aspect of the present disclosure, speaker 110 acts as an energy source to activate the circuitry for performing the acoustic communication for the devices described herein.

The remote programming device 104 also includes an integrated speaker and microphone according to embodiments of the present disclosure. Examples of remote programming devices 104 suitable for use in the system 100 of FIG. 1 include a personal computer, smartphone, or tablet.

As described above, the computing device in remote device 106 (e.g., remote telemetry device or industrial control device) is capable of interpreting received tones and from the received tones deriving digital information such as status messages, configuration parameters, and file transfer including logic application (including an IEC 61131-3 program) and firmware.

The computing device in remote device 106 (e.g., remote telemetry device or industrial control device) is also capable of publishing one or more tones, including a sequence of tones, through the microphone 112. The tones so published are derived from digital information such as data requests, instructions, configuration parameters, a logic application, and/or firmware.

In an embodiment, remote programming device 104 executes an application to convert the published tones to digital data. Likewise, remote programming device 104 executes an application to convert digital data such as a data request, instruction on command, logic application, or file to a series of tones that can be transmitted to an acoustic node 102 at the command of a local or remote user.

The exchange of security credentials acoustically between the programming device 104 and the acoustic node 102 limits or prevents full or partial access to the acoustic node 102 by the programming device 104. The combination of an acoustic credential exchange with a second credential such as an entered password or other secret improves security.

FIGS. 3-6 are flow diagrams illustrating example processes for operating the acoustic node of FIG. 1. In general, processor 114 executes processor-executable instructions stored in memory 116 to implement the processes of FIGS. 3-6.

Figure 3:
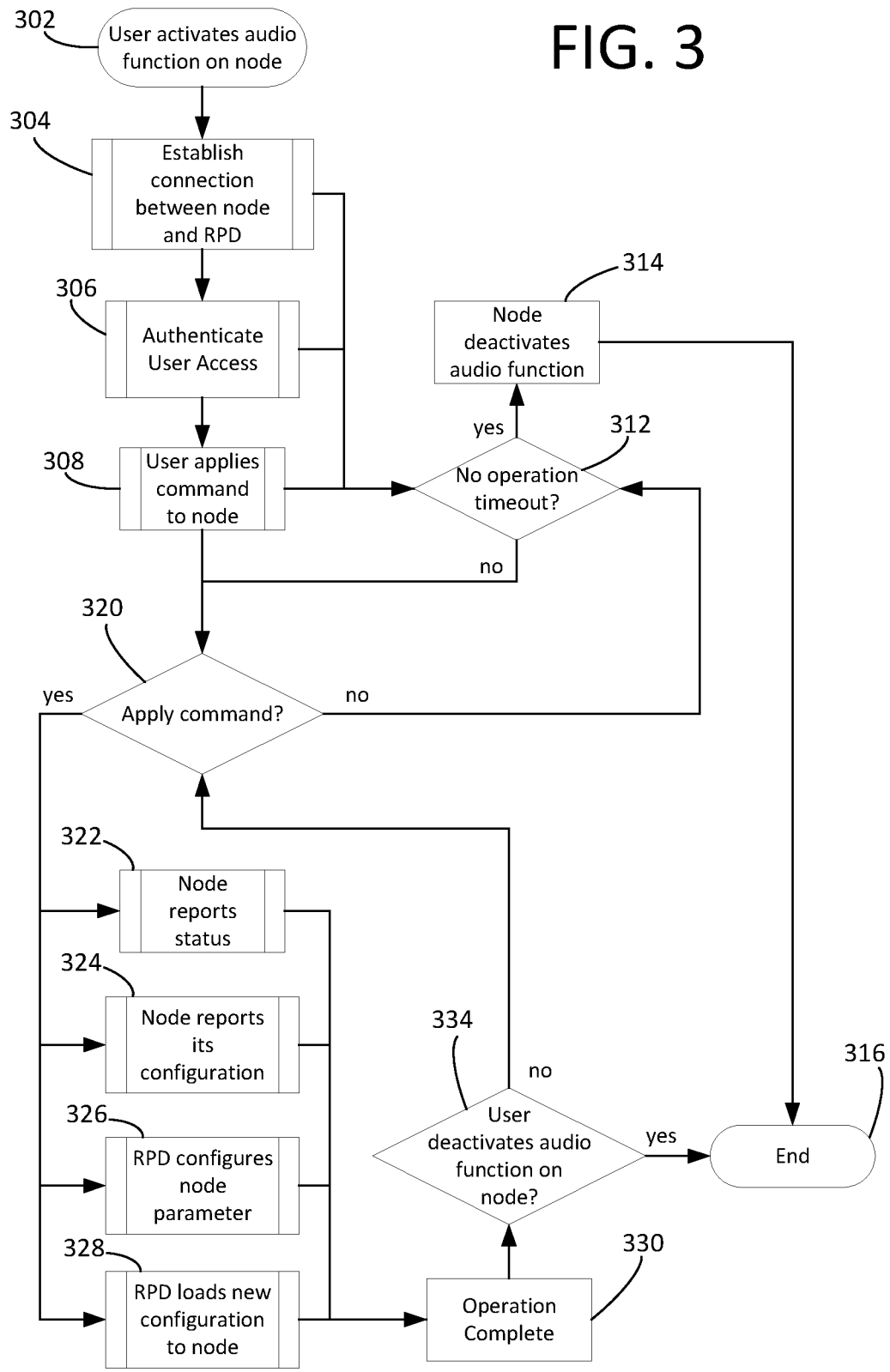
FIGS. 3-6 are flow diagrams illustrating example processes for operating the acoustic node of FIG. 1.

FIG. 3 illustrates an example process for applying a command from remote programming device 104 to remote device 106 via acoustic node 102. Beginning at 302, a user activates the audio function of acoustic node 102 using, for example, the interface 240. The processor 114 establishes a connection between acoustic node 102 and remote programming device 104 at 304, authenticates user access at 306, and receives a user command applied to acoustic node 102 at 308. If the operation has timed out, as determined at 312, node 102 deactivates the audio function at 314 and proceeds to end at 316. On the other hand, if the operation timeout has not been met, processor 114 decides at 320 if it can apply the command at 320. If not, processor 114 again determines if the operation timeout has been met at 312. If the command is applied at 320, operations proceed to 322, 324, 326, and 328. The processes at these steps include, respectively, the node 102 reporting status and reporting its configuration and the remote programming device 104 configuring the parameters and loading a new configuration into node 102. The operation is considered complete at 330. If the user deactivates the audio function on node 102 at 334, the process ends at 316. If the audio function has not been deactivated, the process returns to 320.

Figure 4:
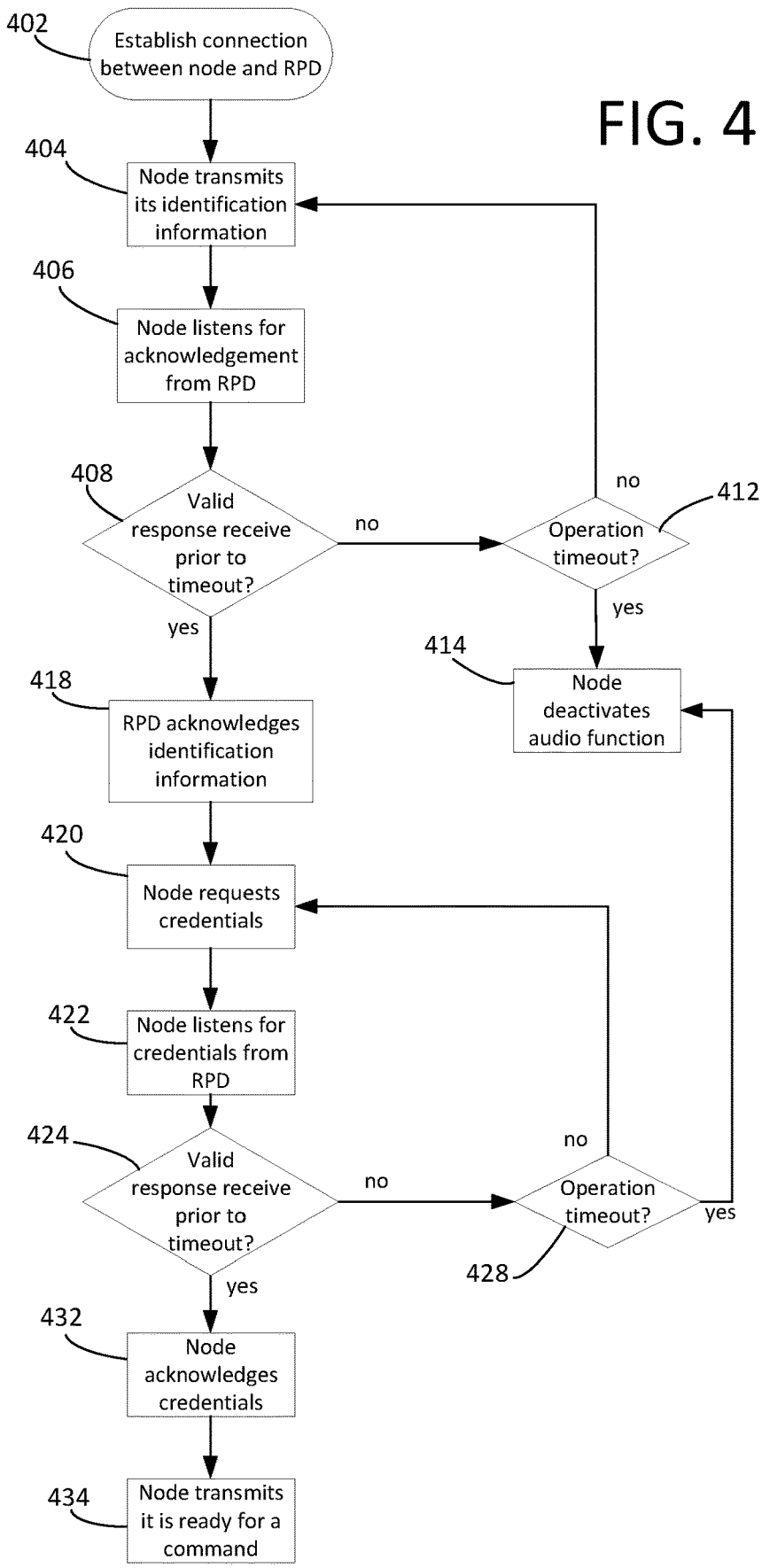

In FIG. 4, an example process is shown for mutually authenticating acoustic node 102 and remote programming device 104 to establish a connection for communication. The connection is established at 402. Proceeding to 404, acoustic node 102 transmits its identification information and, at 406, it listens for an acknowledgement from remote programming device 104. If the response from device 104 is not valid, as determined at 408, processor 114 proceeds to 412 for determining if the operation timeout has been met. If not, operations loop back to 404. Similar to FIG. 3, if the operation has timed out, the acoustic node 102 deactivates the audio function at 414. If processor 114 determines at 408 that the response is valid and it is before timeout, the process continues at 418 where remote programming device 104 acknowledges the identification information. At 420, node 102 requests credentials and, at 422, listens for the requested credentials from remote programming device 104. If the response from device 104 is not valid, as determined at 424, processor 114 proceeds to 428 for determining if the operation timeout has been met. If not, operations loop back to 420. If the operation has timed out, the acoustic node 102 deactivates the audio function at 414. If processor 114 determines at 424 that the response is valid and it is before timeout, the process continues at 432 where node 102 acknowledges the credentials. At 434, node 102 transmits that it is ready to receive a command.

Figure 5:
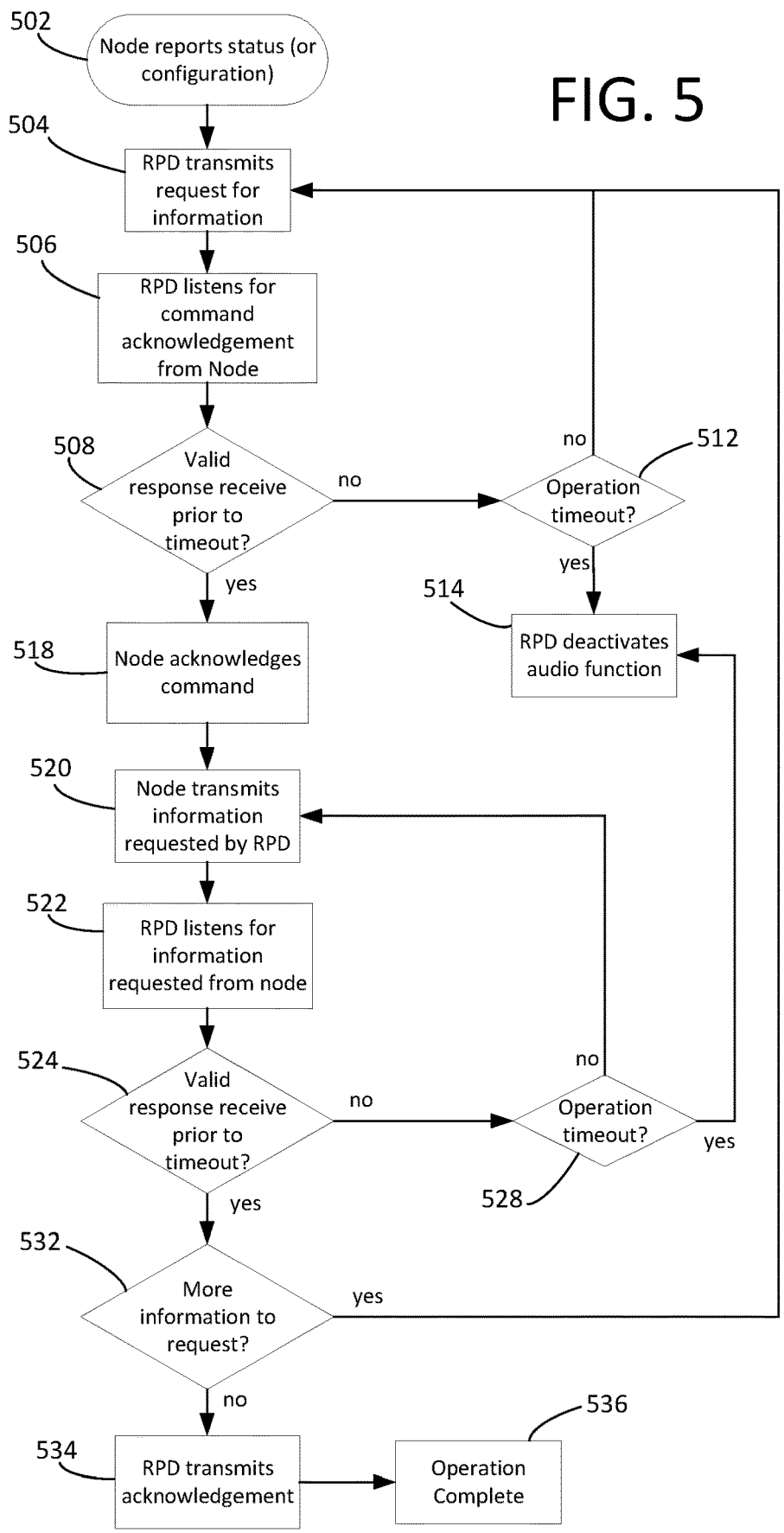

FIG. 5 illustrates an example process for acoustic node 102 to report status or configuration information (including whether the firmware and/or operating system is up-to-date or needs to be updated) to remote programming device 104. The node reports status or configuration at 502. Proceeding to 504, remote programming device 104 transmits a request for information and, at 506, it listens for an acknowledgement from node 102. If the response from device 104 is not valid, as determined at 508, processor 114 proceeds to 512 for determining if the operation timeout has been met. If not, operations loop back to 504. Similar to FIGS. 3 and 4, if the operation has timed out, remote programming device 104 deactivates the audio function at 514. If processor 114 determines at 508 that the response is valid and it is before timeout, the process continues at 518 where node 102 acknowledges the command. At 520, node 102 transmits the information requested by remote programming device 104 and, at 522, remote programming device 104 listens for the requested information from node 102. If the response from node 102 is not valid, as determined at 524, processor 114 proceeds to 528 for determining if the operation timeout has been met. If not, operations loop back to 520. If the operation has timed out, the remote programming device 104 deactivates the audio function at 514. If processor 114 determines at 524 that the response is valid and before timeout, the process continues at 532 where remote programming device 104 requests more information. If more information is requested, operations return to 504. On the other hand, if all of the information has been requested, remote programming device 104 acknowledges the information at 534 and the operation is complete at 536.

Figure 6:
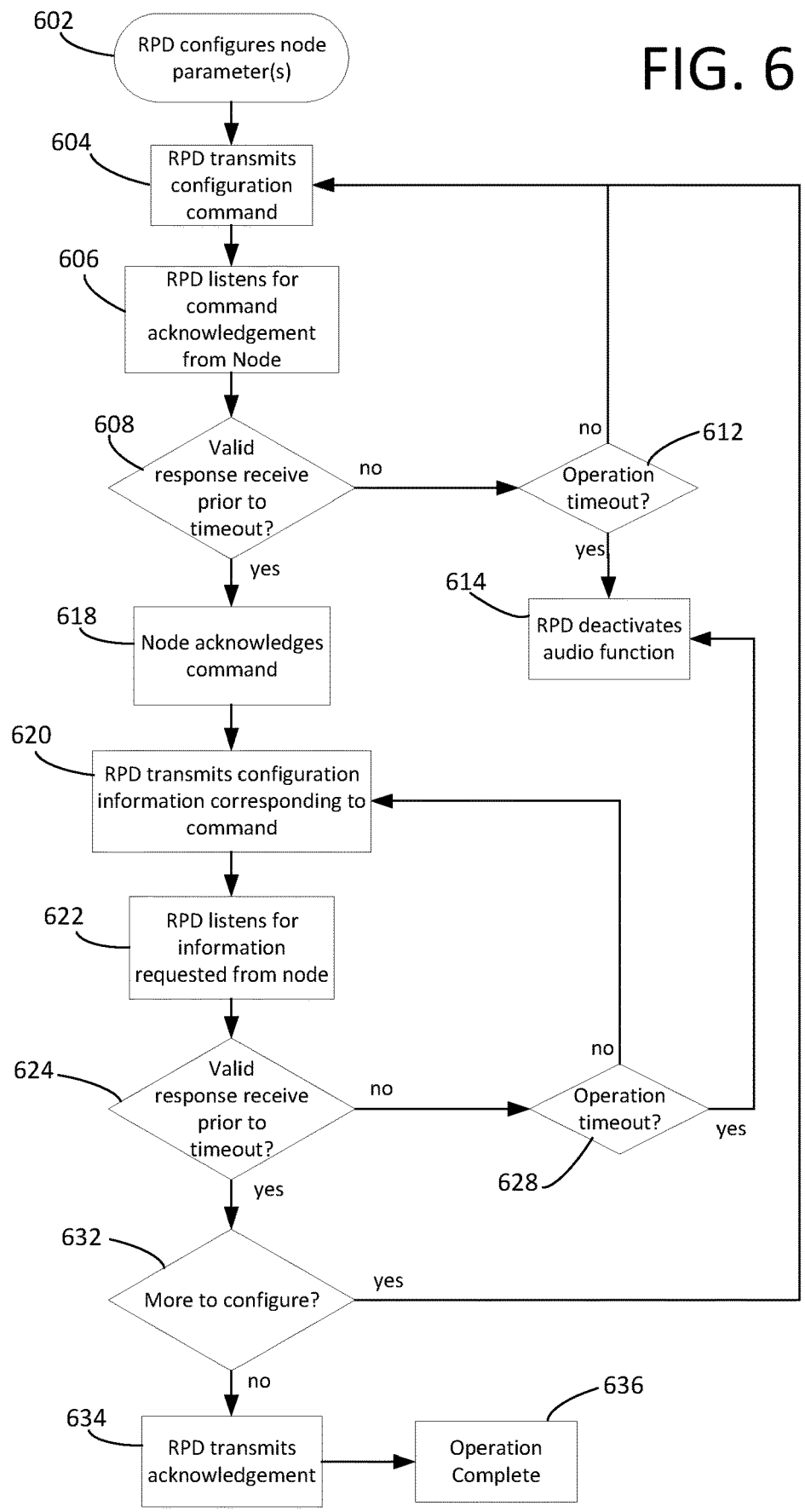

FIG. 6 illustrates an example process for remote programming device 104 to configure acoustic node 102. The remote programming device 104 configures the parameters for node 102 at 602. Proceeding to 604, remote programming device 104 transmits a configuration command to node 102 and, at 606, it listens for an acknowledgement from node 102. If the response from node 102 is not valid, as determined at 608, processor 114 proceeds to 612 for determining if the operation timeout has been met. If not, operations loop back to 604. Similar to FIGS. 3-5, if the operation has timed out, remote programming device 104 deactivates the audio function at 614. If processor 114 determines at 608 that the response is valid and it is before timeout, the process continues at 618 where node 102 acknowledges the command. At 620, remote programming device 104 transmits the configuration information corresponding to the command and, at 622, remote programming device 104 listens for the information requested from node 102. If the response from node 102 is not valid, as determined at 624, processor 114 proceeds to 628 for determining if the operation timeout has been met. If not, operations loop back to 620. If the operation has timed out, the remote programming device 104 deactivates the audio function at 614. If processor 114 determines at 624 that the response is valid and before timeout, the process continues at 632 where processor 114 determines if further configuration is needed. If so, operations return to 604. On the other hand, if configuration is complete, remote programming device 104 transmits an acknowledgement at 634 and the operations cease at 636.

An acoustic interface embodying aspects of the present disclosure addresses the cost and quality challenges with the production and maintenance of a NEMA4 or IP66 compliant external button. In addition, the acoustic interface provides the user a more efficient means of transmitting complex information such as strings, multiple parameters of etc. when compared to simple button approaches.

A major benefit when compared to WIFI, Bluetooth, or other radio-based approaches is that a speaker and microphone of the acoustic interface require significantly less power than a conventional wireless connection. This is of critical importance to battery-powered systems such as IAN or Accutech. Another benefit, of interest to line-powered applications, is that due to increasing concerns related to cybersecurity, the use of WIFI and Bluetooth is becoming more restricted in some industrial applications. Aspects of the present disclosure provide a wire-free interface to industrial devices without the need for networked wireless networks and their associated cost, effort, and security vulnerabilities. Security can be maintained by the user exchanging a sonic key with the acoustic node prior to the acoustic node accepting instruction from the user.

Further benefits of interest apply to devices in sealed cabinets such as PLC, RTU, or VFD. Often direct access to these devices can require a user to have an electrician on-hand to power down the associated equipment and make safe the panel prior to allowing the user to interact with the device directly. An acoustic port on the outside of a panel would provide a mechanism to communicate with the PLC, RTU, VFD or other device inside in order to query its status, adjust its configuration or apply a new logic application amongst other possible actions. In addition, a local operator on site can use a phone connection with a more capable or familiar user (e.g., the supervising engineer or technical support) to exchange diagnostic information or new configurations with the acoustic node.

Embodiments of the present disclosure may comprise a special purpose computer including a variety of computer hardware, as described in greater detail below.

For purposes of illustration, programs and other executable program components may be shown as discrete blocks. It is recognized, however, that such programs and components reside at various times in different storage components of a computing device, and are executed by a data processor(s) of the device.

Although described in connection with an exemplary computing system environment, embodiments of the aspects of the invention are operational with other special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the invention may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and process without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

In view of the above, it will be seen that several advantages of the aspects of the invention are achieved and other advantageous results attained.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

The invention claimed is:

1. A method of remotely configuring an industrial process device in a sealed housing, comprising:
    transmitting first acoustic energy from a remote programming device to the industrial process device, the first acoustic energy having at least one associated tone indicating a request to establish communication between the remote programming device and the industrial process device, the remote programming device being external to the housing;
    processing the tone associated with the first acoustic energy on the industrial process device to identify the request to establish communication and authenticate the remote programming device;
    in response to the industrial process device accepting the request to establish communication, transmitting second acoustic energy from the industrial process device to the remote programming device, the second acoustic energy having at least one associated tone indicating acceptance of the request to establish communication;
    processing the tone associated with the second acoustic energy on the remote programming device to identify the acceptance of the request to establish communication;
    transmitting third acoustic energy from the remote programming device to the industrial process device, the third acoustic energy having at least one associated tone indicating a request for information relating to a current configuration of the industrial process device;
    processing the tone associated with the third acoustic energy on the industrial process device to identify the request for information relating to the current configuration of the industrial process device; and
    transmitting fourth acoustic energy from the industrial process device to the remote programming device, the fourth acoustic energy having at least one associated tone indicating the information relating to the current configuration of the industrial process device.

2. The method of claim 1, further comprising:
    processing the tone associated with the fourth acoustic energy on the remote programming device to identify the current configuration of the industrial process device;
    determining if the current configuration of the industrial process device is up-to-date or needs to be updated;
    in response to determining the current configuration of the industrial process device needs to be updated, transmitting fifth acoustic energy from the remote programming device to the industrial process device, the fifth acoustic energy having at least one associated tone indicative of configuration data to update the current configuration of the industrial process device; and
    processing the tone associated with the fifth acoustic energy on the industrial process device to identify the configuration data and update the current configuration of the industrial process device based on the configuration data.

3. The method of claim 1, wherein processing the tone associated with the first acoustic energy and processing the tone associated with the second acoustic energy comprise exchanging security credentials acoustically between the remote programming device and the industrial process device.

4. The method of claim 1, wherein the industrial process device has an acoustic node coupled thereto for processing and directing acoustic energy.

5. The method of claim 1, further comprising:
    directing fifth acoustic energy from the remote programming device to the industrial process device, the fifth acoustic energy having at least one associated tone indicating a command for the industrial process device; and
    processing the tone associated with the fifth acoustic energy on the industrial process device to identify the command for the industrial process device.

6. The method of claim 5, wherein the command comprises at least one of the following: a data request, an instruction, one or more configuration parameters, a logic application, and firmware.

7. An acoustic node coupled to an industrial process device within a sealed housing, comprising:
    a microphone coupled to a receiver and configured to receive one or more incoming tones from a remote programming device external to the housing;
    a speaker coupled to a transmitter and configured to transmit one or more outgoing tones to the remote programming device;
    an audio processor; and
    a memory device storing processor-executable instructions that, when executed by the audio processor, configure the audio processor for:
        establishing communication between the remote programming device and the industrial process device based on the received one or more incoming tones;
        converting the received audio signal to incoming digital data;
        authenticating the remote programming device based on the incoming digital data; and
        determining a command based on the incoming digital data and instructing the industrial process device to execute the command,
    wherein the remote programming device transmits configuration information corresponding to the command to the industrial process device.

8. The acoustic node of claim 7, wherein the memory device stores processor-executable instructions that, when executed by the audio processor, further configure the audio processor for:
    generating outgoing digital data responsive to the executed command; and
    converting the outgoing digital data to the one or more outgoing tones,
    wherein the speaker transmits the one or more outgoing tones to the remote programming device.

9. The acoustic node of claim 8, wherein the one or more outgoing tones transmitted by the speaker are representative of an acknowledgement and the remote programming device is responsive thereto for validating execution of the command.

10. The acoustic node of claim 8, wherein the command comprises at least one of the following: a data request, an instruction, one or more configuration parameters, a logic application, and firmware.

11. The acoustic node of claim 7, wherein establishing communication between the remote programming device and the industrial process device comprises exchanging security credentials acoustically between the remote programming device and the industrial process device.

12. The acoustic node of claim 7, wherein the memory device stores processor-executable instructions that, when executed by the audio processor, further configure the audio processor for deactivating an audio function of the acoustic node when communication between the remote programming device and the industrial process device is not established within a predetermined timeout period.

13. The acoustic node of claim 7, wherein the industrial process device to which the acoustic node is coupled comprises at least one of the following: a remote telemetry device, a programmable logic controller (PLC), a sensor, a remote terminal unit (RTU), a variable frequency drive (VFD), a motor controller, and a pump off controller (POC).

14. A remotely configurable industrial system, comprising:
an industrial process device within a sealed housing;
a remote programming device external to the housing, the remote programming device configured to transmit and receive audio signals; and
an acoustic node within the housing coupled to the industrial process device, comprising:
a microphone coupled to a receiver and configured to receive an incoming audio signal from the remote programming device;
a speaker coupled to a transmitter and configured to transmit an outgoing audio signal to the remote programming device;
an audio processor; and
a memory device storing processor-executable instructions that, when executed by the audio processor, configure the audio processor for:
establishing communication between the remote programming device and the industrial process device based on the received audio signal;
converting the received audio signal to incoming digital data;
authenticating the remote programming device based on the incoming digital data; and
determining a command based on the incoming digital data and instructing the industrial process device to execute the command,
wherein the remote programming device transmits configuration information corresponding to the command to the industrial process device.

15. The system of claim 14, wherein the memory device stores processor-executable instructions that, when executed by the audio processor, further configure the audio processor for:
generating outgoing digital data responsive to the executed command; and
converting the outgoing digital data to the outgoing audio signal,
wherein the speaker transmits the outgoing audio signal to the remote programming device.

16. The system of claim 15, wherein the outgoing audio signal transmitted by the speaker is representative of an acknowledgement and the remote programming device is responsive thereto for validating execution of the command.

17. The system of claim 15, wherein the command comprises at least one of the following: a data request, an instruction, one or more configuration parameters, a logic application, and firmware.

18. The system of claim 14, wherein establishing communication between the remote programming device and the industrial process device comprises exchanging security credentials acoustically between the remote programming device and the industrial process device.

19. The system of claim 14, wherein the memory device stores processor-executable instructions that, when executed by the audio processor, further configure the audio processor for deactivating an audio function of the acoustic node when communication between the remote programming device and the industrial process device communication is not established within a predetermined timeout period.

20. The system of claim 14, wherein the industrial process device to which the acoustic node is coupled comprises at least one of the following: a remote telemetry device, a programmable logic controller (PLC), a sensor, a remote terminal unit (RTU), a variable frequency drive (VFD), a motor controller, and a pump off controller (POC).

* * * * *